United States Patent
Mason (10) Patent No.: US 11,408,503 B2
(45) Date of Patent: Aug. 9, 2022

(54) SYSTEM AND METHOD FOR A CLUTCH BALANCE PISTON PRESSURE REGULATION SYSTEM

(71) Applicant: SUPERIOR TRANSMISSION PARTS, INC., Tallahassee, FL (US)

(72) Inventor: Dean Mason, Tallahassee, FL (US)

(73) Assignee: Superior Transmission Parts, Inc., Tallahassee, FL (US)

( * ) Notice: Subject to any disclaimer, the term of this patent is extended or adjusted under 35 U.S.C. 154(b) by 0 days.

(21) Appl. No.: 16/888,058

(22) Filed: May 29, 2020

(65) Prior Publication Data

US 2020/0378493 A1  Dec. 3, 2020

Related U.S. Application Data

(60) Provisional application No. 62/853,996, filed on May 29, 2019.

(51) Int. Cl.
*F16H 61/02* (2006.01)
*F16K 11/07* (2006.01)
*F16H 61/00* (2006.01)

(52) U.S. Cl.
CPC ..... *F16H 61/0251* (2013.01); *F16H 61/0206* (2013.01); *F16K 11/0712* (2013.01); *F16H 2061/0062* (2013.01); *F16H 2061/0253* (2013.01)

(58) Field of Classification Search
CPC ............. F16K 11/0712; F16H 61/0251; F16H 61/0206; F16H 2061/0253; F16H 2061/0062
See application file for complete search history.

(56) References Cited

U.S. PATENT DOCUMENTS

| | | | | |
|---|---|---|---|---|
| 2,857,780 A | * | 10/1958 | Thomasm | F16H 61/0267 477/141 |
| 3,424,037 A | * | 1/1969 | Searles | F16H 61/0267 477/137 |
| 4,524,803 A | * | 6/1985 | Stoll | F16K 27/048 137/625.64 |
| 5,792,019 A | * | 8/1998 | Park | F16H 37/022 475/206 |
| 6,390,134 B1 | * | 5/2002 | Hanby | B23K 9/32 138/44 |

(Continued)

*Primary Examiner* — Patrick C Williams
(74) *Attorney, Agent, or Firm* — Dowell & Dowell, P.C.

(57) ABSTRACT

A system and method for an automotive transmission includes one or more restrictor devices that are installed within a valve body of the automotive transmission to improve performance by establishing a flow limit along the compensator circuit. The complex fluid circuits of certain automotive transmissions having eight to ten speeds allow line pressure supply to bleed out during certain critical functions, such as low rotations per minute hot engagements, which can severely damage the transmission. By limiting flow, the line pressure supply can be preserved to prevent the compensator circuit from bleeding out in these critical functions. The instant invention limits flow by replacing the standard compensator valve with a compensator valve that has a larger spool diameter. Flow is further reduce by another restriction device placed along the compensator circuit between the compensator valve and the clutch drums.

10 Claims, 12 Drawing Sheets

(56) References Cited

U.S. PATENT DOCUMENTS

| | | | | |
|---|---|---|---|---|
| 7,438,088 B2 * | 10/2008 | Matsumoto | ......... | F15B 13/0433 |
| | | | | 137/625.64 |
| 2003/0111314 A1 * | 6/2003 | Moorman | ........... | F16D 25/0638 |
| | | | | 192/85.25 |
| 2007/0004549 A1 * | 1/2007 | Chryssochoos | ..... | F16H 59/0204 |
| | | | | 475/149 |
| 2007/0235671 A1 * | 10/2007 | Feigel | ................. | F16K 31/0613 |
| | | | | 251/129.01 |

* cited by examiner

| RANGE | GEAR | SHIFT SOL 1 | SHIFT SOL 2 | 1-2-3-4 CL PC SOL 5 N.L. | 2-6 CL PC SOL 4 N.L. | 3-5 REV CL PC SOL 2 N.H. | LOW REV 4-5-6 CL PC SOL 3 N.H. | 1-2-3-4 CLUTCH | 3-5 REV CLUTCH | 4-5-6 CLUTCH | 2-6 CLUTCH | LOW & REV CLUTCH | LOW CLUTCH SPRAG |
|---|---|---|---|---|---|---|---|---|---|---|---|---|---|
| PARK | P | ON | ON | OFF | OFF | OFF | ON | | | | | APPLIED | |
| REV | R | ON | OFF | OFF | OFF | ON | ON | | APPLIED | | | APPLIED | |
| NEU | N | ON | ON | OFF | OFF | OFF | ON | | | | | APPLIED | |
| | 1st BRAKING | ON | ON | ON | OFF | OFF | ON | | | | | APPLIED | HOLDING |
| D | 1st | OFF | ON | ON | OFF | OFF | OFF | APPLIED | | | | | HOLDING |
| | 2nd | OFF | ON | ON | ON | OFF | OFF | APPLIED | | | APPLIED | | |
| | 3rd | OFF | ON | ON | OFF | ON | OFF | APPLIED | APPLIED | | | | |
| | 4th | OFF | ON | ON | OFF | OFF | ON | APPLIED | | APPLIED | | | |
| | 5th | OFF | ON | OFF | OFF | ON | ON | | APPLIED | APPLIED | | | |
| | 6th | OFF | ON | OFF | ON | OFF | ON | | | APPLIED | | | |

SYSTEM AND METHOD FOR A CLUTCH BALANCE PISTON PRESSURE REGULATION SYSTEM

CROSS-REFERENCE TO RELATED APPLICATIONS

The present application claims the benefit of U.S. provisional application No. 62/853,996, filed on May 29, 2019.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention pertains to the field of automotive transmissions, and specifically to a system and method for limiting fluid flow through certain transmission circuits, namely, a clutch balance piston, or compensator, circuit, to preserve line pressure supply during critical functions.

Brief Description of the Related Art

Figure 1:
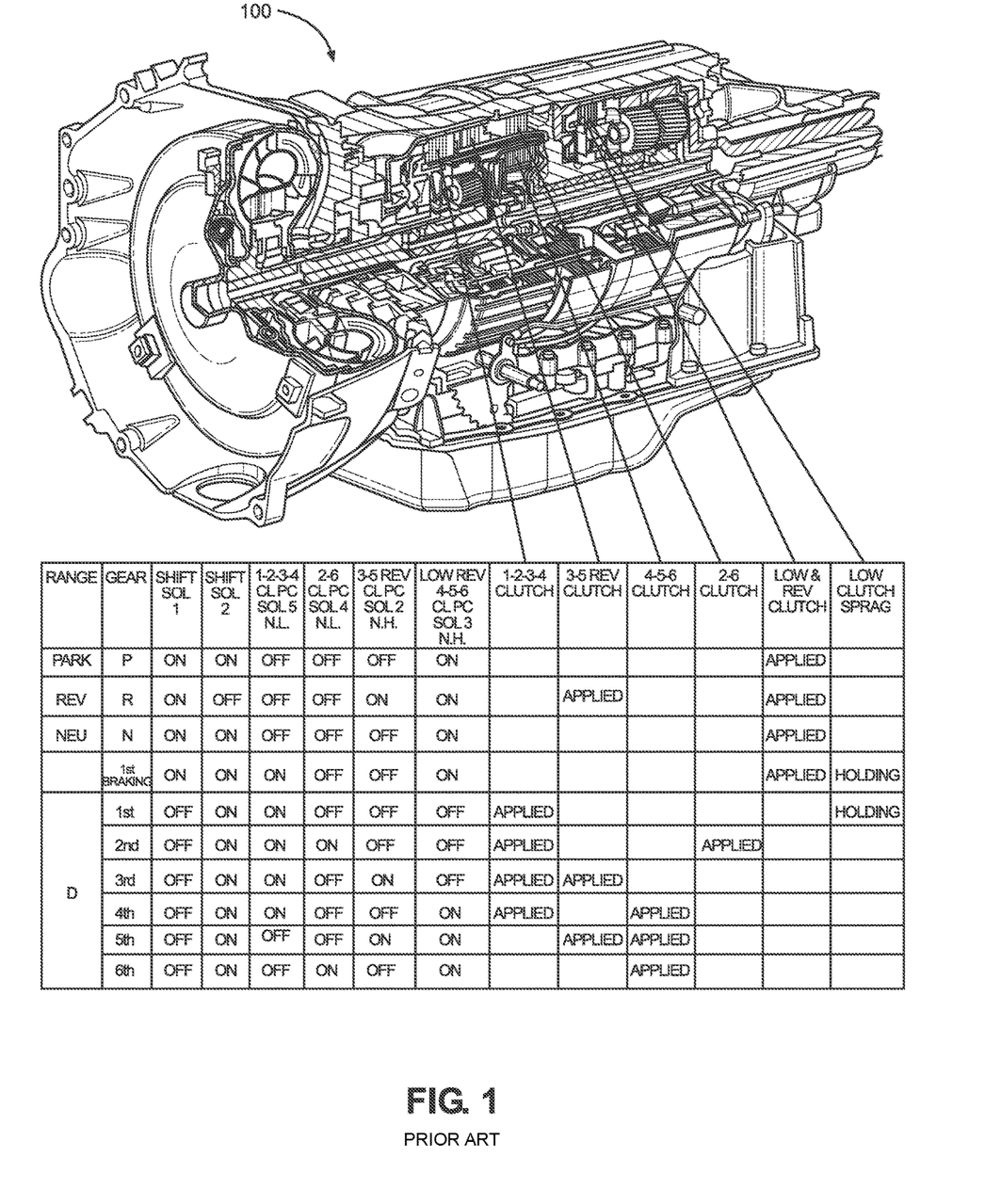
FIG. 1 is illustrative diagram of a representative transmission cutout and corresponding chart that identifies clutch structural locations within the transmission and their application in different gears.

With development of the Ravigneaux double planetary gear set, greater gear ratios of eight to ten speeds have become possible in automotive transmissions. FIG. 1 shows a transmission employing such a gear set, along with a corresponding chart mapping different applications of clutches and solenoids in each gear. In such transmission systems some clutches can become busy with many combinations of solenoids and clutches. For example, in the D range, the 3-5-R clutch is off in $1^{st}$ and $2^{nd}$ gear, is on in $3^{rd}$ gear, is off again in $4^{th}$ gear, back on in $5^{th}$ gear, and off once more in $6^{th}$ gear. The busier a transmission system becomes, the more finely tuned a control system for the transmission system must be in order to maintain a smooth, seamless operation between gears.

As explained, contemporary automatic automotive transmissions capable of a six to ten speed range tend to become very busy, such that they continually shift up and down between gears with various operating and load conditions. Additionally, these transmissions are managed by electronic control systems that run constant real-time digital calculations. It has therefore become imperative that these transmissions are precisely controlled to correctly and timely apply and release transmission components to ensure proper function. Given the amount of components in these transmissions, and the evolving integration of, and control given to, computer systems into the transmission, it is unsurprising that accidental, and harmful, conditions occur sporadically in these transmissions.

One possible problem with managing these transmissions may be explained through a hypothetical situation. For example, a truck equipped with a representative transmission, e.g. a 6L80E transmission, is driving down a highway in sixth gear with cruise control on at 45 miles per hour (mph). The truck eventually pulls up behind a tractor on the highway travelling at 30 mph, and the driver of the truck wants to get around the tractor quickly. Referencing the component application chart of FIG. 1, the 4-5-6 and 2-6 clutches are applied in sixth gear. The truck ideally should downshift from sixth gear to third gear, or the passing gear, upon application of the throttle. This would warrant the 4-5-6 and 2-6 clutches releasing and the input (1-2-3-4) and 3-5-R clutches applying. However, if the truck has been cruising in sixth gear for a long period of time, the 3-5-R clutch, being a good distance above the sump, may have drained down due to air intrusion and lost its charge. If this occurs, instead of a quick down-shift from sixth gear to third gear, the transmission neutralizes as there is a time delay as the 3-5-R circuit refills. This in turn may cause the truck to be caught in a vulnerable position in another lane of traffic and able to pass the tractor.

Figure 2:
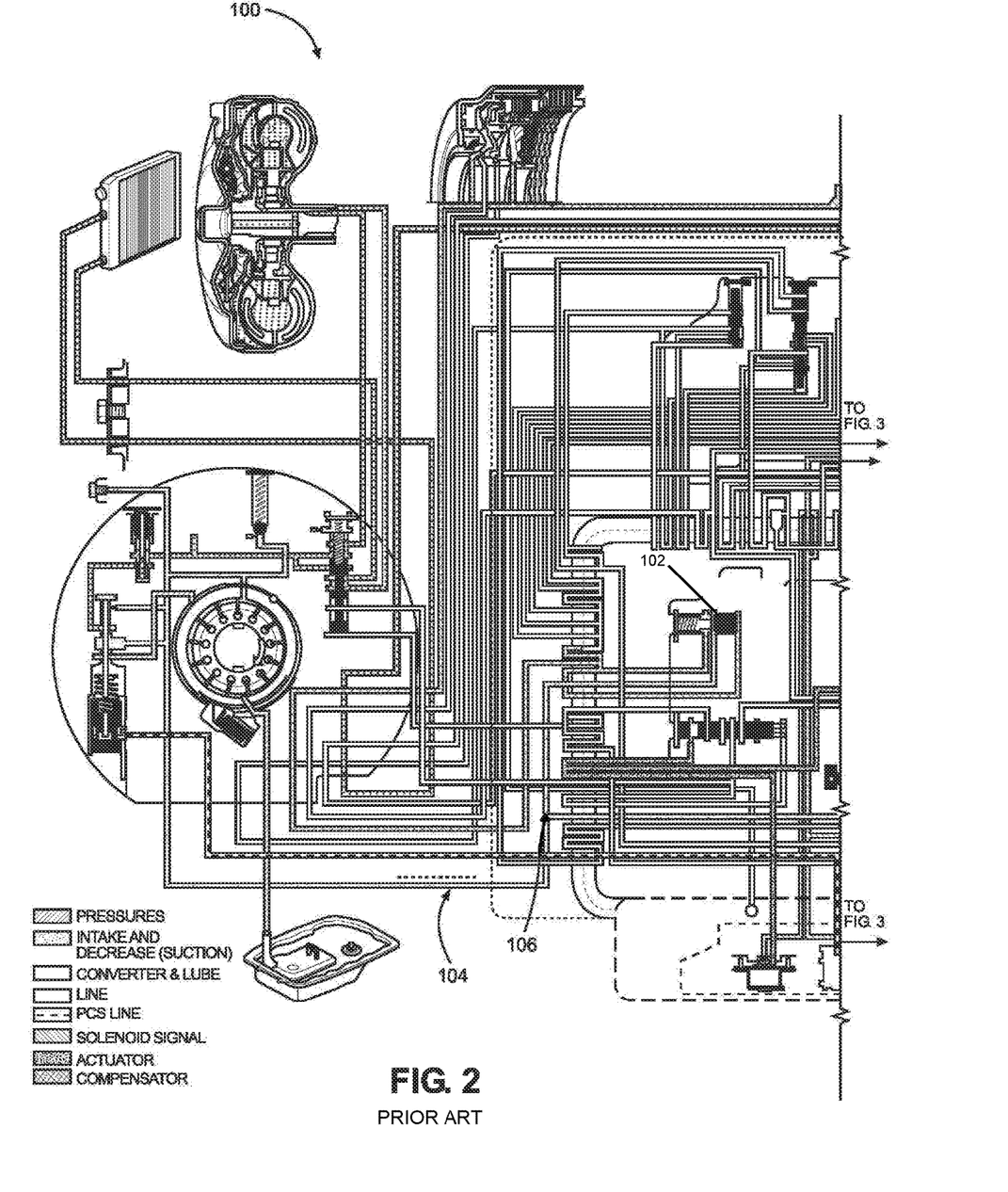
FIG. 2 is a partial illustrative representation of a hydraulic system of the representative transmission.
Figure 3:
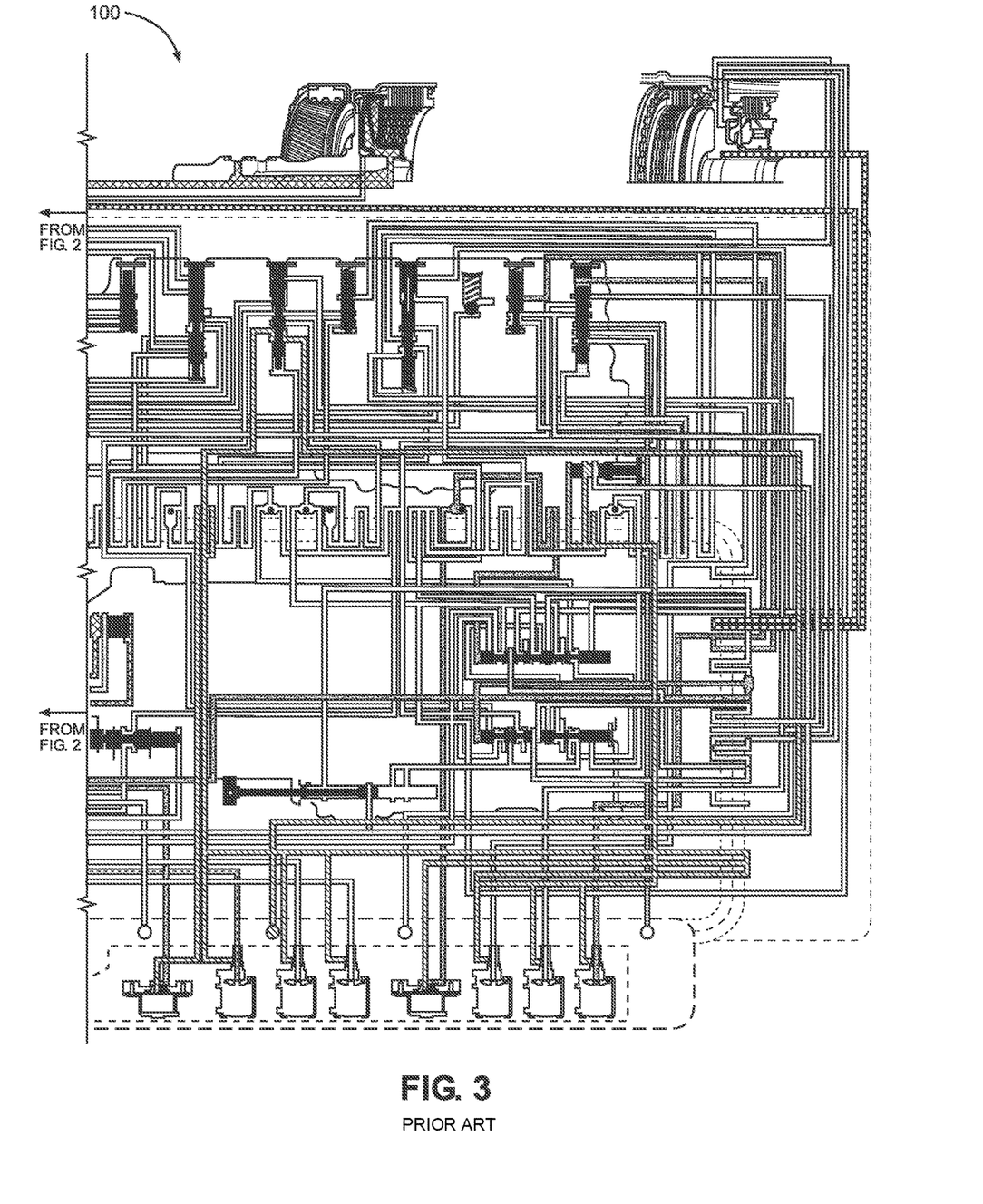
FIG. 3 is an illustrative representation of the remaining hydraulic system of FIG. 2.
Figure 4:
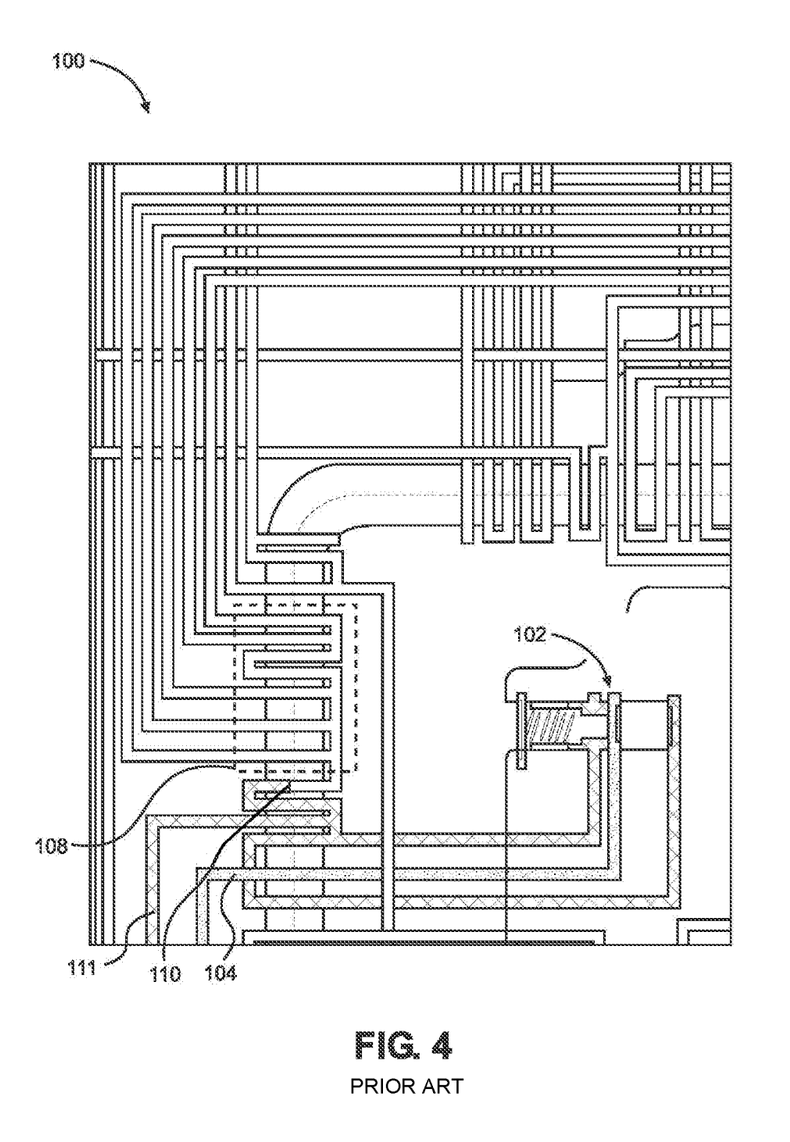
FIG. 4 is an illustrative representation of a portion of the hydraulic system of FIG. 2 showing a compensator valve, an exhaust backfill area, and surrounding connections.

FIGS. 2-3 show an illustrated hydraulic system 100 of a representative transmission. A compensator valve 102 controls fluid flow to a 1-2-3-4 clutch, 3-5 Reverse clutch, 4-5-6 clutch assembly, and clutch drums from line pressure supply 104 to a lower valve body. A junction 106 in the line pressure supply circuit 104 forks to supply the compensator valve and circuit to the clutches and to an upper valve body casing. An exhaust backfill circuit 108, shown in FIG. 4, is meant to address the problem illustrated by the hypothetical situation by maintaining a circuit prime, or minimum pressure above zero. The exhaust backfill circuit 108 is connected to the clutch exhaust systems at the various shift valves. A backfill orifice 110 denotes a point in the compensator circuit 111 that supply is distributed to individual backfill circuits.

Figure 5:
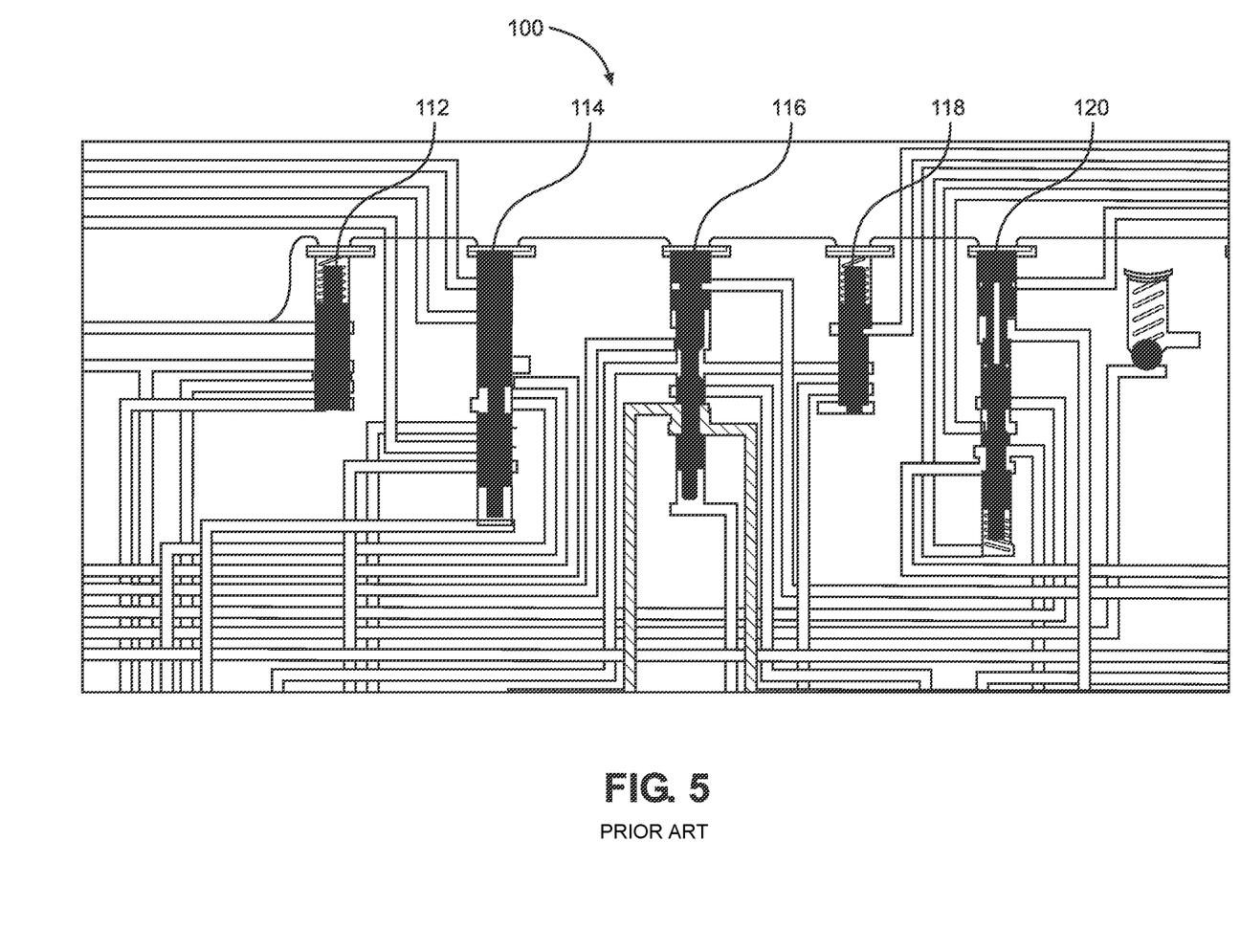
FIG. 5 is an illustrative representation of a portion of the hydraulic system of FIG. 3 showing various clutch valves.

FIG. 5 shows shift valves 112, 114, 116, 118, and 120 from FIG. 3 in back shifted positions, or when clutch is not applied. Notably, high pressure is not necessary to keep the clutch system from draining down. Typically, a circuit prime of only 3-5 pound-force per square inch (PSI) of pressure, or 20.6843-34.4738 kilopascal (kPa) is sufficient to keep fluid in the clutch system. These circuits fill the clutch circuits from the back side of the clutch feed system.

One concern, however, is that it is possible for residual fluid in the clutch drums under the pistons to begin to overcome release spring tension and centrifugally apply, or at least drag, the clutch when apply is not intended, while in operation at high rotations per minute (RPM). A counterbalance strategy is currently employed in these transmissions to address this concern. Compensator pressure at 10-12 PSI, or 68.9476-82.7371 kPa, is routed to balance pistons to oppose backfill pressure and the effect of centrifugal force when clutch drums spin by holding the clutch apply piston in a released position. When the clutch is being applied by line pressure, it easily overcomes compensator PSI. On the other hand, when the clutch is release, compensator PSI has no problem holding the piston released against the lower backfill pressure. The intention of this setup is to ensure that the circuit is primed, and a controlled apply and a quick release of the clutch.

Figure 7:
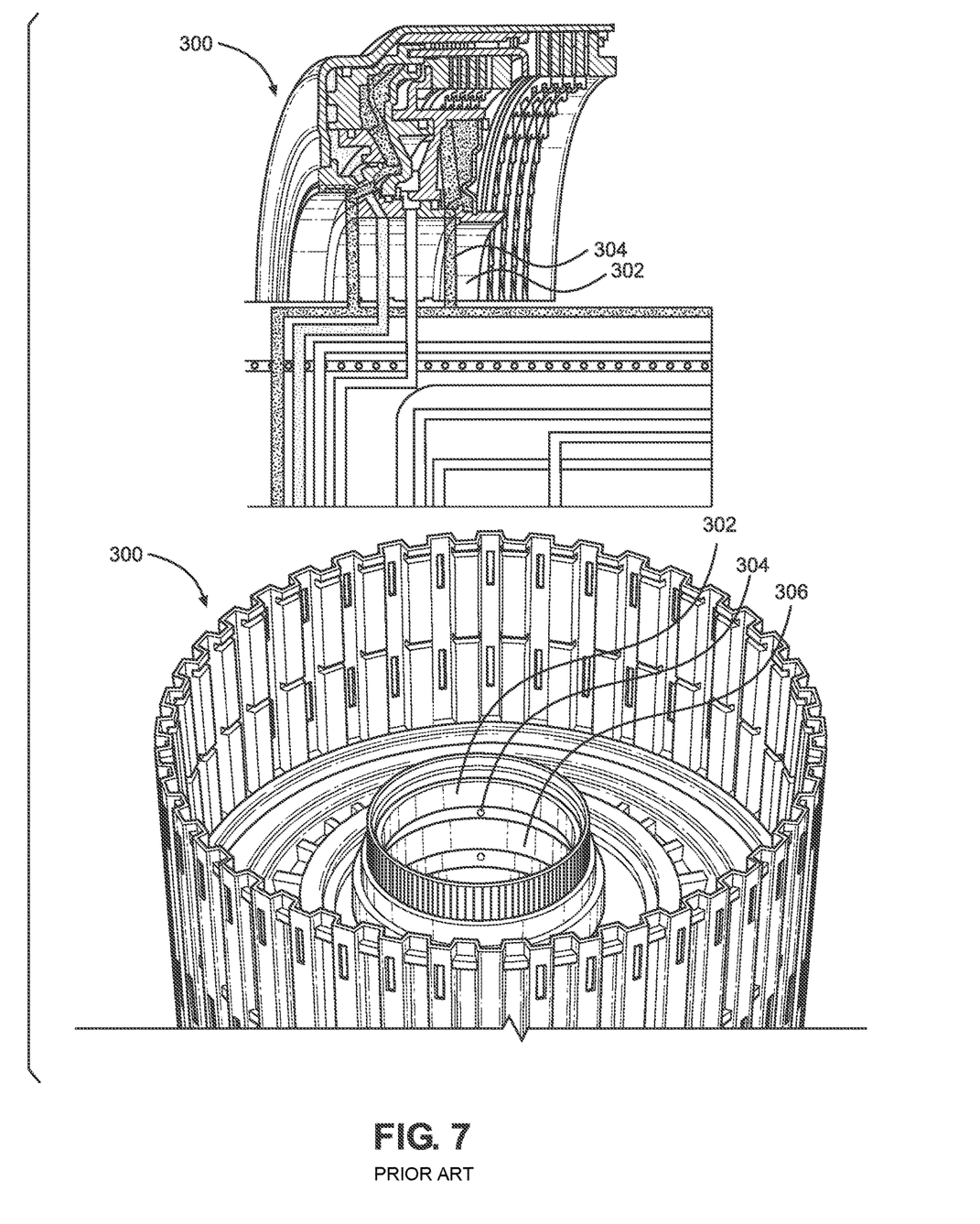
FIG. 7 is a comparison between a portion of the illustrative representation of the hydraulic system of FIG. 2 and a clutch drum comparing corresponding parts between the illustrative representation and the clutch drum.

The provided counter-balance strategy works under perfect conditions. However, conditions in a transmission are rarely perfect. For instance, an accumulation of small leaks and minor, yet gradual, wear are unavoidable over time. Such leaks and wear change internal conditions. FIG. 7 demonstrates an area where such wear becomes an issue. In a compensator circuit opening 304, oil is fed into a clutch drum 300 between a sealing ring 306 on one side and the drum support bushing 302 on another side. A worn bushing obviously is not ideal, but even a new bushing does not create a perfect seal. Leaks from a worn bushing 302 will affect the pressure and operation of the fluid system.

Figure 6:
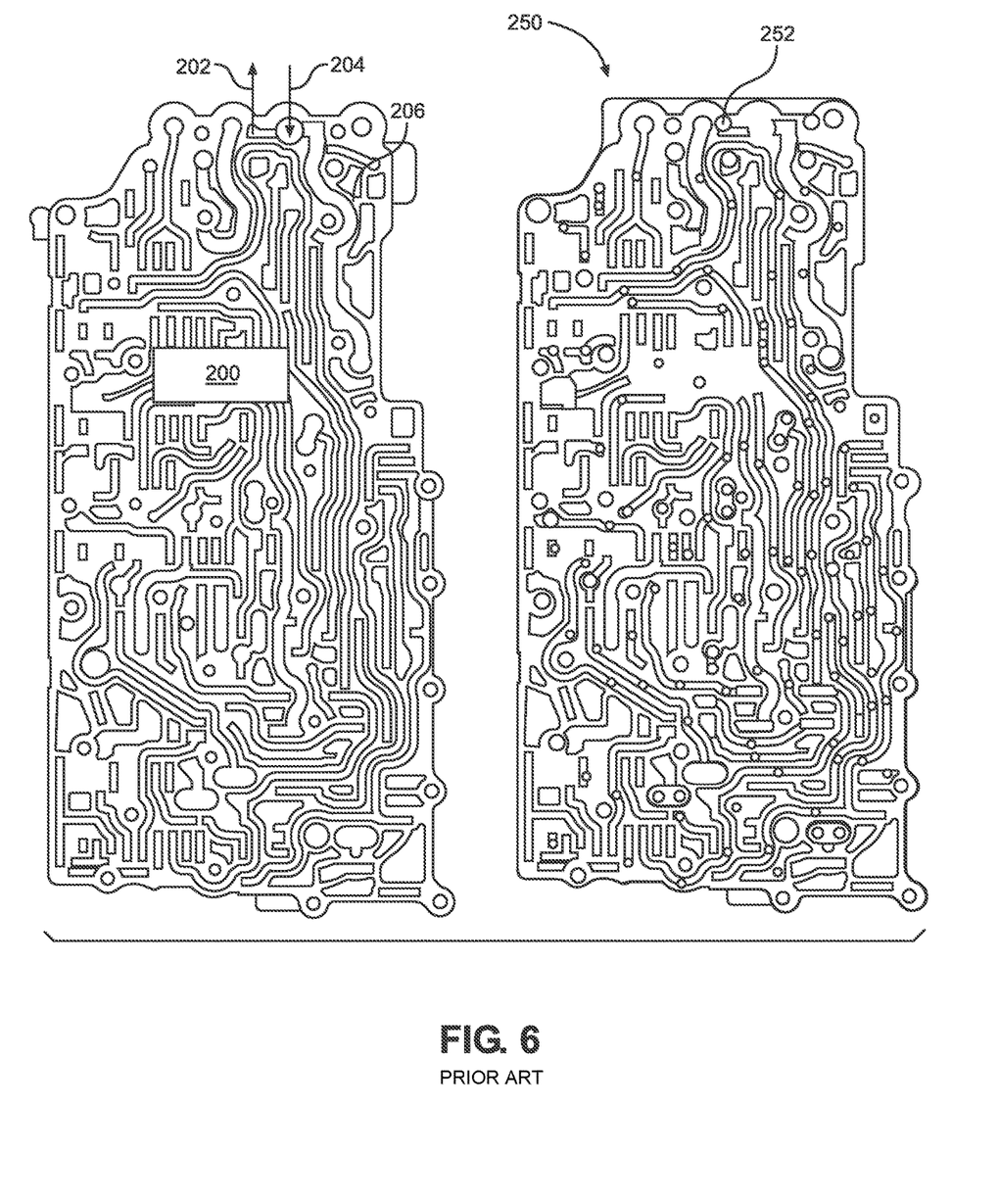
FIG. 6 is a side-by-side view of an upper valve body casting and valve body plate showing input and output areas for a pump supply junction.

FIG. 6 shows an upper valve body 200 of the representative transmission along with a corresponding plate 250. Orifice 204 channels fluid away from the compensator valve, while passage 202 corresponds to orifice 252 on the plate 250 to provide a path to the compensator valve. Passage 206 leads to the manual valve. Orifice 252 is loosely 0.203 inches (") in diameter, and at 100 PSI, or 689.476 kPa, would allow roughly 7 gallons per minute (GPM), or 0.0004416314 cubic meters per minute ($m^3$/s), of ATF flow through. When combined with volume supply necessary to charge other primary circuits, this amount of flow exceeds what a pump puts out at idle RPM when hot.

In addition, priorities must be established between operating conditions and parameters within a hydraulic system. The main pressure regulator valve in the pump provides a classic example. With the engine off, the pump slide is pushed to max output position. On engine start-up, the pump draws automatic transmission fluid (ATF) through the filter and begins charging the main line circuits to the manual valve, shift valves, etc. The pressure regulator torque converter land then opens to charge the converter. When all circuits are satisfied, the pressure regulator valve moves down to open the decrease land, directing line pressure to the backside of the slide to trim pump volume output to match line pressure and pump volume output requirements. Typically, as the transmission gets hotter, manual valve and other leaks begin to tax ATF supply. The most taxing state is a hot idle engagement, when engine RPM and pump speed is the lowest. In this state, leaks are at their greatest. A reverse engagement takes a big portion of pump output to fill the 3-5-R clutch and the low/reverse clutch piston cavities, while slowing pump speed even more. At such times, the pump slide will go to maximum output position. If this is not sufficient to maintain line pressure demand, the pressure regulator valve will start to shut down the converter circuit in order to prevent a large drop in line pressure, for example down to 30 PSI, or 206.843 kPa, when a delayed, slow, and/or poor quality engage occurs.

Consistent converter charge and cooler flow are very important, but the converter should receive less priority under such circumstances. During hot idle engagements, especially reverse engagements, the converter land may close for several seconds to hold back pump volume for clutch circuits until engage is completed. If this did not happen, for instance if the converter had too much priority in the transmission hydraulic system, excess pressure drop would occur, engagements would suffer and clutch failure would be accelerated.

As such, permitting unrestrained flow to the compensator valve creates a high risk of eventual transmission failure. The instant system and method address this concern to solve the stated problem of prioritizing convertor flow.

BRIEF SUMMARY OF THE INVENTION

An object of the of present invention is to teach a method of improving an automotive transmission, including installing one or more restrictor devices within the automotive transmission; and using the one or more restrictor devices to establish a fluid flow limit that preserves line supply pressure to prevent a compensator circuit from losing pressure before or during critical functions.

Another object of the present invention is to teach a compensator valve having a cylindrical body with opposing ends, each opposing end having a coaxial member extending away from the cylindrical body, each coaxial member having a smaller diameter than the cylindrical body; a cylindrical cavity extending along a partial length of the cylindrical body and open along a face of one of the coaxial members; a first set of coaxial lands forming a plurality of concentric rings along an outer surface of the cylindrical body; and a second set of coaxial lands forming a plurality of concentric rings along an outer surface of the cylindrical body, wherein a spool surface is defined between the first set of coaxial lands and the second set of coaxial lands.

A further objective of the instant invention is to teach a restrictor plug having a cylindrical body having opposing ends, each opposing end having an opening, each opening defining opposing ends of a channel longitudinally extending within the cylindrical body, wherein each opening has a different diameter, and wherein the outer surface of the cylindrical body has at least two different diameters.

Another object of the present invention is to teach a compensator pressure regulation system, including a compensator valve, having a cylindrical body with opposing ends, each opposing end having a coaxial member extending away from the cylindrical body, each coaxial member having a smaller diameter than the cylindrical body; a cylindrical cavity extending along a partial length of the cylindrical body and open along a face of one of the coaxial members; a first set of coaxial lands forming a plurality of concentric rings along an outer surface of the cylindrical body; and a second set of coaxial lands forming a plurality of concentric rings along an outer surface of the cylindrical body, wherein a spool surface is defined between the first set of coaxial lands and the second set of coaxial lands; and a restrictor plug, having a cylindrical body having opposing ends, each opposing end having an opening, each opening defining opposing ends of a channel longitudinally extending within the cylindrical body, wherein each opening has a different diameter, and wherein the outer surface of the cylindrical body has at least two different diameters, wherein the compensator valve and the restrictor plug are installable within a valve body of an automotive transmission.

BRIEF DESCRIPTION OF THE SEVERAL VIEWS OF THE DRAWING

A better understanding of the invention will be had in reference to the following views of the drawings.

The embodiments of the instant invention will be better understood with reference to the following detailed description.

DETAILED DESCRIPTION OF THE INVENTION

The foregoing description of embodiments of the invention has been presented to illustrate the principles of the invention and not to limit the invention to the particular embodiments illustrated. It is intended that the scope of the invention be defined by all embodiments encompassed within the scope of the following claims and their equivalents.

The instant method and system solves the problem of unrestrained flow to the compensator valve with a redesigned compensator valve to replace the original equipment manufacturer (OEM) compensator valve, a restrictor device to further control fluid flow through the compensator circuit, and steps for installing the redesigned compensator valve and restrictor device in representative transmissions.

Figure 13:
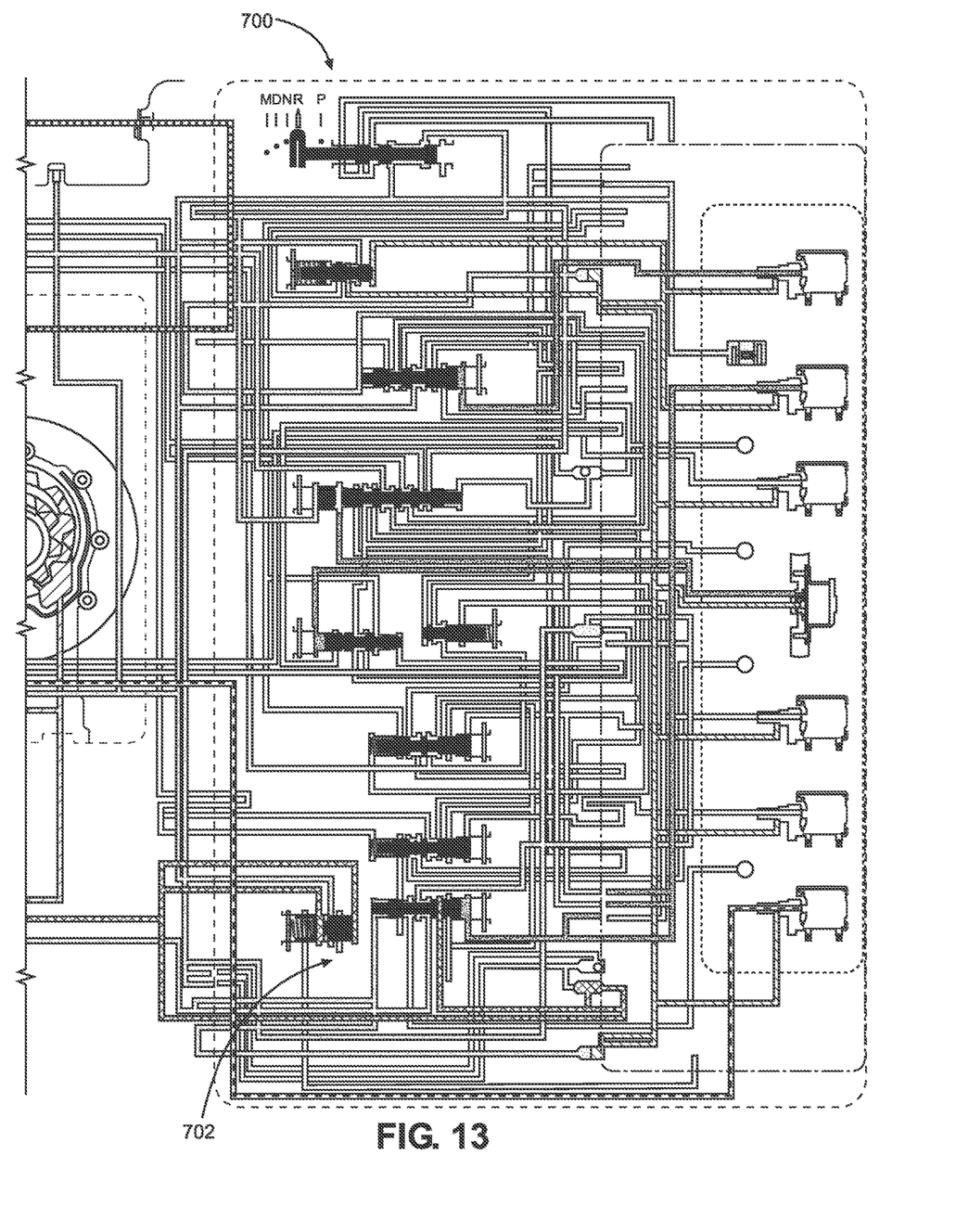
FIG. 13 is illustrative diagram of an alternatively representative transmission cutout and corresponding chart that identifies clutch structural locations within the transmission and their application in different gears.

The inventions disclosed herein pertain to after-market components, systems, and methods applicable to improving operation of six to ten speed automotive transmissions, preferably General Motors (GM) six speed rear wheel drive (RWD) transmission series 6L45E, 6L50E, 6L80E, 6L90E, etc. The instant inventions are also applicable to GM six speed forward wheel drive (FWD) transmission series 6T40 and 6T45. The FWD transmission utilize the same compensator regulator system and the RWD transmission, with identical function, but do not include the exhaust backfill circuitry. The illustration provided in FIGS. 2 and 3 shows a RWD system, while FIG. 13 shows an illustration of a partial FWD system to illustrate the lack of the exhaust backfill circuitry. These transmissions, along with other transmissions with similar structures and functions, are included in the representative transmissions.

Figure 8A:
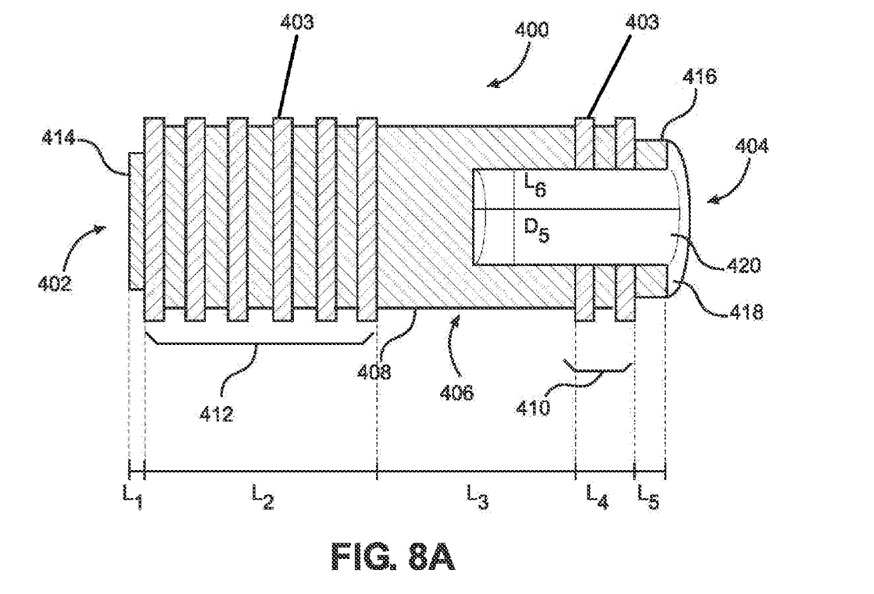
FIG. 8A is a cross-sectional view of an embodiment of a compensator valve.
Figure 8B:
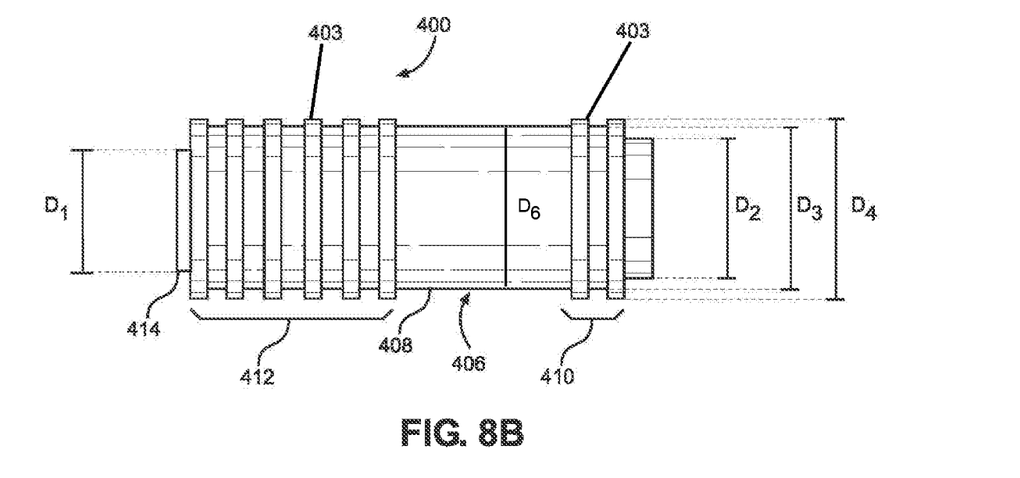
FIG. 8B is a side view of the compensator valve of FIG. 8A.

A preferred embodiment of a compensator valve 400 is shown in FIGS. 8A-8B. FIG. 8A shows a cross-sectional view of the compensator valve 400, while FIG. 8B shows a side view of the same. The compensator valve 400 has a cylindrical body 406 with two opposing longitudinal ends 402 and 404. The compensator valve 400 is closed along end 402 and open along end 404. A coaxial member 414 extends away from the cylindrical body 406 along the end 402, and another coaxial member 416 extends way from the cylindrical body along the end 404.

An opening 418 within the coaxial member 416 leads into a cylindrical cavity 420 extending a partial length of the cylindrical body 406. The cylindrical cavity 420 is shaped to receive and secure a spring once installed within a valve body of an automotive transmission, preferably a representative transmission.

The cylindrical body 406 is longitudinally defined in three sections 408, 410, and 412. In the preferred embodiment, section 410 includes two raised concentric rings 403, together forming a land, around the cylindrical body 406 and coaxial therewith. Section 412 includes six concentric rings 403, together forming another land, evenly spaced and around the cylindrical body 406. Section 408, or a spool surface, is defined between sections 410 and 412 and has no lands. The number of rings 403 in each section 410 and 412 is not critically important, and may vary as appropriate. The concentric rings 403 are provided to produce the desired diameter for the land of each section 410 and 412 for proper function of the valve in limiting fluid flow longitudinally along the cylindrical body past the lands, and also in providing grooves for particulates to be collected between lands to reduce bore wear within the valve that occurs when such particulates become lodged between a bore and a land.

In the preferred embodiment of the compensator valve 400, coaxial member 414 has a length, $L_1$, of 0.046" or 1.1684 millimeters (mm). The section 412 has a length, $L_2$, of 0.696" or 17.6784 mm. The section 408 has a length, $L_3$, of 0.565" or 14.351 mm. The section 410 has a length, $L_4$, of 0.180" or 4.572 mm. The coaxial member 416 has a length, $L_5$, of 0.218" or 5.5372 mm. The cylindrical cavity 420 has a length, $L_6$, of 0.600" or 15.24 mm.

In the preferred embodiment of the compensator valve 400, coaxial member 414 has a diameter, $D_1$, of 0.400" or 10.16 mm. The coaxial member 416 has a diameter, $D_2$, of 0.545" or 13.843 mm. The grooves between the lands 403 of sections 410 and 412 have a diameter, $D_3$, of 0.5903" plus or minus 0.0002", or 14.9936 mm plus or minus 0.0051 mm. The lands 403 of sections 410 and 412 have a diameter, $D_4$, of 0.550" or 13.97 mm. The cylindrical cavity 420 has a diameter, $D_5$, of 0.345" or 8.763 mm. The section 408 has a diameter, $D_6$, of between 0.573-0.574" or 14.5542-14.5796 mm.

The spool surface 408 diameter $D_6$ is sized to preferably provide a flow rate equivalent to a 0.140", or 3.556 mm, diameter hole. The spool surface 408 diameter may be sized to provide a flow rate equivalent to between a 0.093-0.187", or 2.3622-4.7498 mm, diameter hole, or orifice, from the compensator valve 400. To match that range of orifices, the corresponding spool surface 408 diameter may be between 0.559-0.582", or 14.1986-14.7828 mm. This flow rate is below an OEM flow rate for the OEM compensator valve.

Figure 9A:
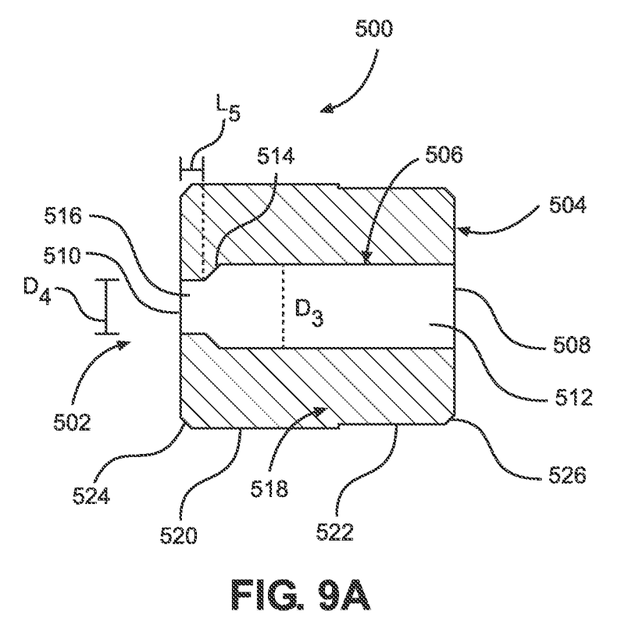
FIG. 9A is cross-sectional view of a restrictor plug according to an embodiment of the instant invention.
Figure 9B:
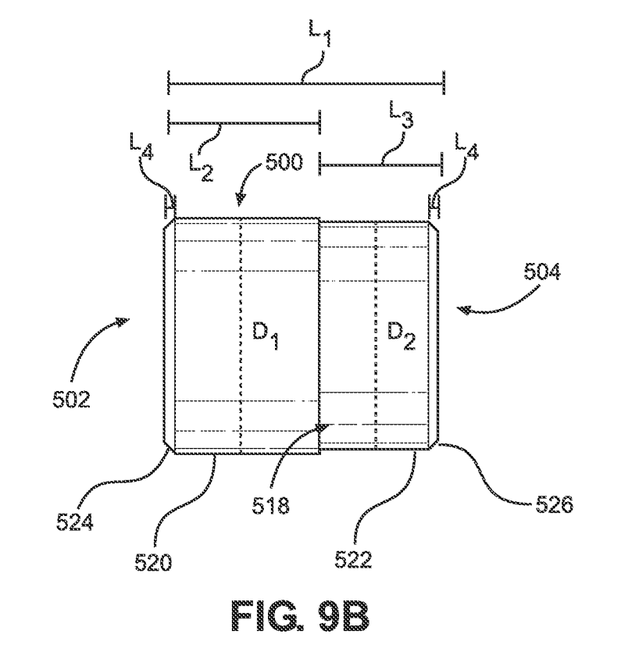
FIG. 9B is a side view of the restrictor plug of FIG. 9A.

FIGS. 9A-9B depicts a preferred embodiment of a restrictor device, namely, a restrictor plug 500. The restrictor device may be any structure that further restricts fluid flow in the compensator circuit, such as plug, a valve, or a capillary restrictor. The restrictor plug 500 is shaped to be conveniently fit into an existing structure of a lower valve body of representative transmissions. FIG. 9A is a cross-sectional view of the restrictor plug 500. The restrictor plug 500 has a cylindrical body 518 with two opposing ends 502 and 504. Each opposing end 502 and 504 also has a coaxial opening 510 and 508, respectively, connected by a central channel 506 extending longitudinally through a longitudinal center of the cylindrical body 518. In the preferred embodiment, the central channel 506 includes a large cylindrical chamber 512, a small cylindrical chamber 516, and a connecting chamber 514 connecting the large cylindrical chamber 512 and the small cylindrical chamber 516 that reduces the diameter of the central channel from a diameter of the large cylindrical chamber to the diameter of the small cylindrical chamber, or from $D_3$ to $D_4$.

The cylindrical body 518 includes two longitudinal portions 520 and 522 having two slightly different diameters. In the preferred embodiment, the cylindrical body 518 has a beveled edge 524 and 526 around a circumference of each respective opposing end 502 and 204.

In the preferred embodiment of the restrictor plug 500, the restrictor plug has a total length, $L_1$, of 0.360" or 9.144 mm. The portion 520 has a length, $L_2$, of 0.185" or 4.699 mm. The portion 522 has a length, $L_3$, of 0.135" or 3.429 mm. The beveled edges 524 and 526 have a length, $L_4$, of 0.020" or 0.508 mm. The beveled edges are preferably angled at 30 degrees (°) relative to the length of the restrictor plug 500. The small cylindrical chamber 516 has a length, $L_5$, of 0.050" or 1.27 mm. The remaining length of the central channel 506, including the large cylindrical chamber 512 and connecting chamber 514, has a length, $L_6$, of 0.355" or 9.017 mm.

In the preferred embodiment of the restrictor plug 500, portion 520 has a diameter, $D_1$, of 0.309-0.310" or 7.8486-7.874 mm. The portion 522 has a diameter, $D_2$, of 0.305-0.306" or 7.747-7.7724 mm. The large cylindrical chamber 512 has a diameter, $D_3$, of 0.147" or 3.7338 mm. The small cylindrical chamber 516 has a diameter, $D_4$, of 0.098" or 2.4892 mm. In other embodiments of the restrictor device, central channel 506, including one or more chambers 512, 514, or 516, may have a diameter between 0.084-0.187", or 2.1336-4.7498 mm.

Figure 10:
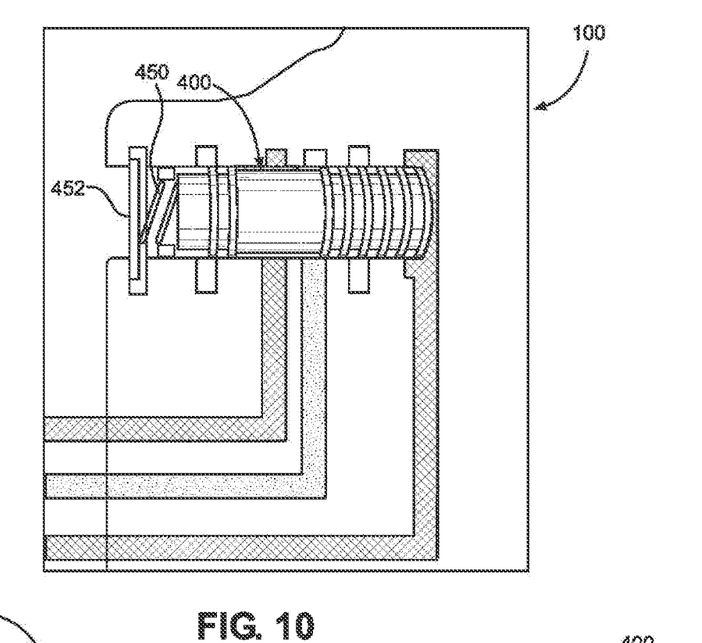
FIG. 10 is an illustration of the compensator valve of FIGS. 8A and 8B replacing the OEM compensator valve.

FIG. 10 shows the compensator valve 400 installed in the representative transmission 100 via a lower valve body. The compensator valve 400 replaces the OEM compensator valve, which is removed from the lower valve body before the compensator valve 400 is installed. The compensator valve is secured within the lower valve body by a spring 450 and cap 452.

Figure 11:
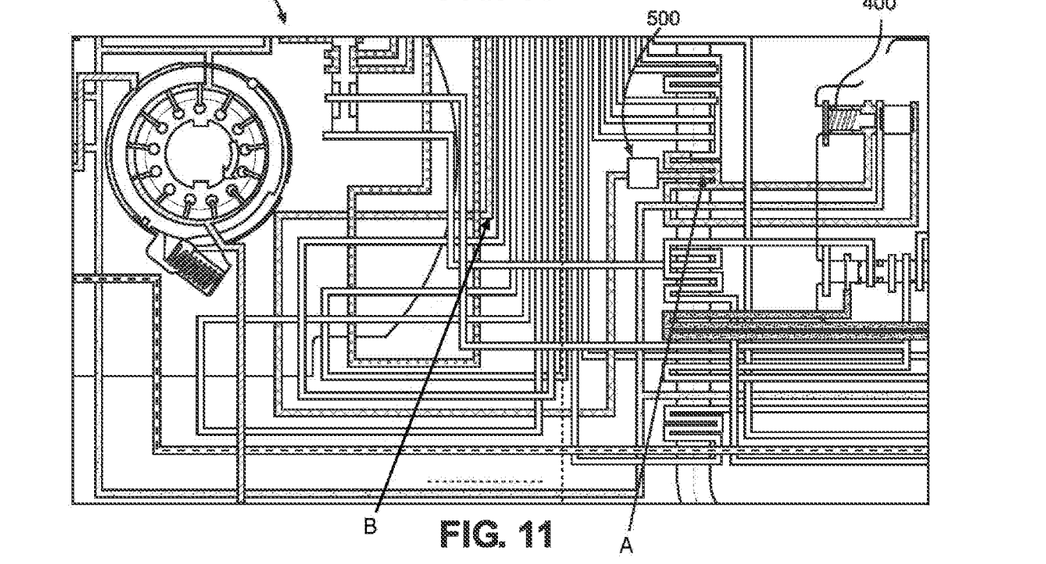
FIG. 11 is an illustration of a restrictor area between point A and B along a compensator feed pathway.

FIG. 11 illustrates a portion of the hydraulic system shown in FIG. 2 of the representative transmission 100 with the preferred embodiments of the compensator valve 400 and restrictor plug 500 installed. While the compensator valve 400 replaces the OEM compensator valve, the restrictor plug 500 is entirely new to the representative transmission and does not replace an OEM part. There is no respective OEM part for the restrictor device in representative transmissions. The preferred location of the restrictor plug 500 installation in the lower valve body is one of convenience, as this location allows for both the compensator valve 400 and restrictor plug 500 to be installed within the lower valve body, while the compensator circuit travels beyond just the lower valve body. This allows for the system to be installed and the representative transmission 100 to be improved by only removing the lower valve body and without removing the entire transmission from the vehicle. However, the restrictor plug 500, or other similar restrictor device, may be installed anywhere along the compensator circuit between points A and B shown in FIG. 11. Points A and B exist along the compensator circuit from the compensator valve to the clutch drums.

Figure 12A:
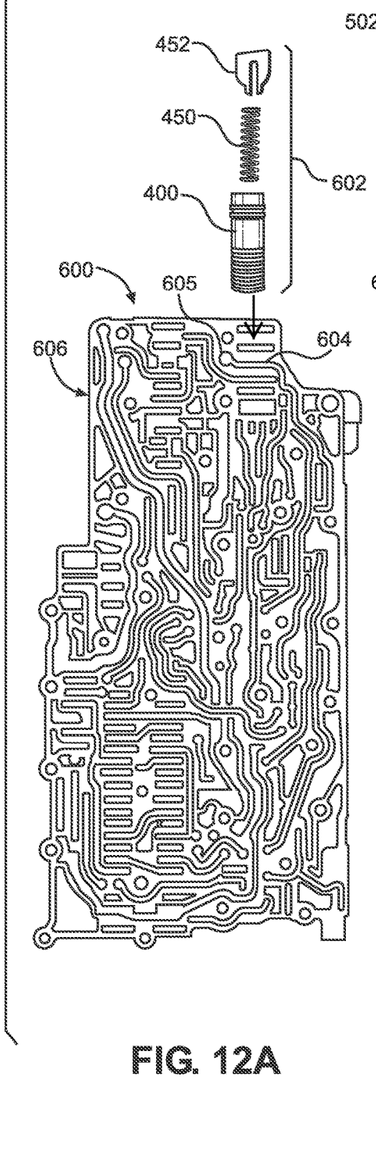
FIG. 12A is a top view of a lower valve body in multiple views illustrating a method of converting the lower valve body according to an embodiment of the present invention.
Figure 12B:
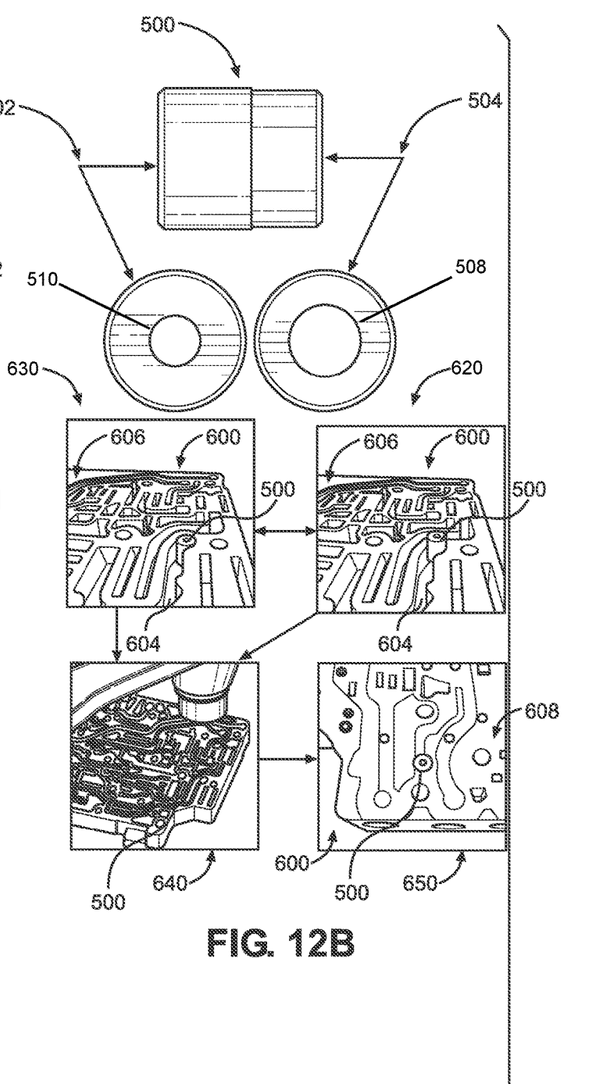
FIG. 12B is composite view of the restrictor plug of FIGS. 9A and 9B.

FIG. 12A illustrates steps in a preferred method of improving an automotive transmission. A lower valve body 600 of the automotive transmission is first removed. The OEM compensator valve is removed from the lower valve body 600 and an improved compensator valve system 602, including the compensator valve 400, a spring 450, and a cap 452 are inserted, as shown, to replace the OEM compensator valve. A restrictor device, the restrictor plug 500 in this case, is then installed in the lower valve body 600. FIG. 12B shows the restrictor plug 500, and the two ends 502 and 504, in a composite view to show the difference in opening 510 and 508 diameters. Installation of the restrictor plug 500 begins in either 620 or 630. A channel 604 in the lower valve body 600 forms a part of the compensator circuit, and the restrictor plug 500 is installed in an opening 605 at one end of the channel 604. The channel 604 is not machined to exact sizes across transmissions, so the restrictor plug 500 is designed to accommodate variations in size across several thousandths of inches, hence the difference in diameters for portions 520 and 522. First, the restrictor plug 500 is inserted in the opening 605 in channel 604 along surface 606 with end 502 and smaller opening 510 facing up, or away from the lower valve body 600. The restrictor plug 500 should fetch about halfway down in the opening 605, as shown in step 620. If the restrictor plug 500 goes down farther, as shown in step 630, then the restrictor plug should be flipped over such that end 508 and the larger diameter opening 508 are facing upwards. A washer, 7 mm or equivalent (about 0.060-0.070" or 1.524-1.778 mm thick), is then placed over the restrictor plug 500 and a user gently taps the washer with a hammer or similar tool until an upper surface of the washer is flush with the lower valve body 600, as shown in step 640. The restrictor plug 500 should extend beyond an opposite surface 608 of the lower valve body 600 by about 0.015-0.020", or 0.381-0.508 mm.

The restrictor plug 500 provides a secondary orifice for limiting fluid flow through the compensator circuit. The restriction on fluid flow only pertains to fluid downstream from the backfill circuits, and flow through the pump and to the clutch drum balance pistons. The compensator valve 400 and restrictor plug 500 together establish a fluid flow limit to preserve line supply pressure and prevent the compensator circuit from bleeding out needed line pressure during critical functions like low-RPM hot reverse engagements. This establishes a proper priority of functions within the transmission. The in-series 0.140", or 3.556 mm, orifice of the compensator valve 400 to 0.098", or 2.4892 mm, orifice of the restrictor plug 500 creates a flow differential that insures and protects proper clutch engagement and shift control. Since compensator flow rates are lowest at lower line pressure values, minimal compensator flow and leakage occurs during engagements when clutch drums and planetary gears are not rotating, minimizing any negative impact.

As previously discussed, the restrictor device need not be limited to the restrictor plug 500. Any other plug, valve, capillary restrictor, or similar device that limits flow from the compensator valve may be used. Further, the provided structure of the restrictor plug 500 fits in the opening 605 in the lower valve body and provides the recited restriction on fluid flow through the 0.098 orifice, but may differ in structure if located at another location between points A and B identified in FIG. 11. The system described herein preferably limits flow into or out of the compensator valve, for the purpose of limiting fluid flow to the balance pistons, to below 2.5 GPM, or 0.0001577255 m³/s.

FIG. 13 shows an illustration of a hydraulic system of an alternative automotive transmission 700 that has a similar compensator circuit, but does not employ a similar exhaust backfill circuitry, as with the representative transmission 100. The system of transmission 100, shown in FIGS. 2 and 3, is typical of the RWD variations representative transmissions. The inventions disclosed herein are still, however, applicable to the representative transmission 700, which includes a system typical of FWD variations. The embodiments of the compensator valve 400 and restrictor device are applicable in either transmission 100 or 700.

For the FWD transmission 700, the compensator valve 400 should have a flow rate specific spool diameter $D_6$ between the lands 410 and 412 with a flow rate equivalent to that represented by an orifice in a range of 0.084-0.187", or 2.1336-4.7498 mm, at a pressure gradient of 10-15 PSI, or 68.9476-103.421 kPa. The restrictor device for the FWD transmission includes a plug, valve, capillary restrictor, or similar device that yields a flow rate equivalent to that of a 0.084-0.187", or 2.1336-4.7498 mm, orifice and limits flow into or out of the compensator valve 500, and specifically limits compensator flow to the balance pistons to below 2.5 GPM, or 0.0001577255 m³/s.

I claim:

1. A method of preserving line supply pressure a compensator circuit in an automotive transmission, comprising:
    replacing an OEM (original equipment manufacturer) compensator valve with a restricting compensator valve having a larger spool diameter between regulating lands than a corresponding spool diameter of the OEM compensator valve to reduce fluid flow past the restricting compensator valve to the compensator circuit below an OEM flow rate;
    installing a restrictor device along the compensator circuit of the automotive transmission to provide an additional orifice that further reduces the fluid flow through the compensator circuit below the OEM flow rate; and
    using the restrictor device and the restricting compensator valve to establish a fluid flow limit that restricts a fluid flow rate through the compensator circuit to below an OEM fluid flow rate to preserve line supply pressure in the compensator circuit.

2. The method of claim 1, wherein the larger spool diameter is between 14.5542-14.5796 millimeters (mm).

3. The method of claim 1, wherein the larger spool diameter is between 14.1986-14.7828 mm, inclusive.

4. The method of claim 1, wherein the restrictor device is installed along the compensator circuit between the restricting compensator valve and clutch drums.

5. The method of claim 4, wherein the restrictor device is chosen from a group consisting of a plug, valve, or capillary restrictor.

6. The method of claim 1, wherein the fluid flow rate through the compensator circuit is restricted to below 0.0001577255 cubic meters per second (m3/s).

7. The method of claim 1, wherein the restrictor device is a plug comprising:
    a cylindrical body having opposing ends, each opposing end of said opposing ends having an opening, each opening defining opposing ends of a channel longitudinally extending within the cylindrical body,
    wherein each opening has a different diameter, and
    wherein the outer surface of the cylindrical body has at least two different diameters.

8. The method of claim 7, wherein the plug is installed in a channel of the lower valve body, and is operably installable along either said opposing ends of the cylindrical body to accommodate variations in the channel size.

9. The method of claim 1, wherein the restricting compensator valve comprises:
    a cylindrical body with opposing ends, each opposing end having a coaxial member extending away from the cylindrical body, each coaxial member having a smaller diameter than the cylindrical body;
    a cylindrical cavity extending along a partial length of the cylindrical body and open along a face of one of the coaxial members;
    a first set of coaxial lands forming a plurality of concentric rings along an outer surface of the cylindrical body; and
    a second set of coaxial lands forming a plurality of concentric rings along an outer surface of the cylindrical body,
    wherein a spool surface is defined between the first set of coaxial lands and the second set of coaxial lands, the larger spool diameter being a diameter of the restricting compensator valve along the spool surface.

10. The method of claim 9, wherein a spring and a cap secure the restricting compensator valve within the lower valve body.

* * * * *